US009411598B2

(12) United States Patent
Bonanno et al.

(10) Patent No.: US 9,411,598 B2
(45) **Date of Patent: *Aug. 9, 2016**

(54) SEMI-EXCLUSIVE SECOND-LEVEL BRANCH TARGET BUFFER

(71) Applicant: International Business Machines Corporation, Armonk, NY (US)

(72) Inventors: James J. Bonanno, Wappingers Falls, NY (US); Ulrich Mayer, Weil im Schoenbuch (DE); Brian R. Prasky, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/501,093

(22) Filed: Sep. 30, 2014

(65) Prior Publication Data

US 2015/0019849 A1 Jan. 15, 2015

Related U.S. Application Data

(63) Continuation of application No. 13/524,314, filed on Jun. 15, 2012.

(51) Int. Cl.
*G06F 9/38* (2006.01)
*G06F 9/30* (2006.01)

(52) U.S. Cl.
CPC .......... *G06F 9/3806* (2013.01); *G06F 9/30145* (2013.01); *G06F 9/3808* (2013.01)

(58) Field of Classification Search
CPC .......................... G06F 9/3804; G06F 12/0862
USPC ......................................... 712/238, 239, 240
See application file for complete search history.

(56) References Cited

U.S. PATENT DOCUMENTS

| | | | |
|---|---|---|---|
| 5,163,140 | A | 11/1992 | Stiles et al. |
| 5,574,871 | A | 11/1996 | Hoyt et al. |
| 6,088,793 | A | 7/2000 | Liu et al. |
| 6,154,833 | A | 11/2000 | Murty et al. |
| 6,247,122 | B1 | 6/2001 | Henry et al. |
| 6,332,190 | B1 | 12/2001 | Hara |
| 6,539,458 | B2 | 3/2003 | Holmberg |
| 6,553,488 | B2 | 4/2003 | Yeh et al. |

(Continued)

OTHER PUBLICATIONS (Sep. 2005) Method for Increasing Target Density in a BTB. IPCOM000128938D, 4 pages.

(Continued)

*Primary Examiner* — Andrew Caldwell
*Assistant Examiner* — Michael Metzger
(74) *Attorney, Agent, or Firm* — Cantor Colburn LLP; William A. Kinnaman, Jr.

(57) ABSTRACT

Embodiments relate to a semi-exclusive second-level branch target buffer. An aspect includes a computer-implemented method for a semi-exclusive second-level branch target buffer. The method includes performing a search to locate entries in a BTB2 having a memory region corresponding to a search request. Based on locating the entries in the BTB2, a bulk transfer of located entries is performed from the BTB2 to a BTBP. A state associated with the located entries is updated to encourage exclusivity between the BTB1 and the BTB2. Based on transferring a BTBP entry from the BTBP to a BTB1, a BTB1 entry is evicted from the BTB1. The evicted BTB1 entry is transferred from the BTB1 to the BTB2.

12 Claims, 6 Drawing Sheets

(56) References Cited

U.S. PATENT DOCUMENTS

| | | | | |
|---|---|---|---|---|
| 6,560,693 | B1 | 5/2003 | Puzak et al. | |
| 6,601,161 | B2 | 7/2003 | Rappoport et al. | |
| 7,024,545 | B1 | 4/2006 | Zuraski, Jr. et al. | |
| 7,082,520 | B2 | 7/2006 | Bonanno et al. | |
| 7,120,784 | B2 | 10/2006 | Alexander et al. | |
| 7,278,012 | B2 | 10/2007 | Sartorius et al. | |
| 7,434,037 | B2 | 10/2008 | Park et al. | |
| 7,493,480 | B2 | 2/2009 | Emma et al. | |
| 7,533,252 | B2 | 5/2009 | Davis et al. | |
| 7,657,726 | B2 | 2/2010 | Emma et al. | |
| 7,783,870 | B2 * | 8/2010 | Levitan et al. | 712/238 |
| 7,805,595 | B2 | 9/2010 | Ozer et al. | |
| 7,831,817 | B2 | 11/2010 | Biles | |
| 8,166,345 | B2 | 4/2012 | Abou-Emara et al. | |
| 2004/0015683 | A1 * | 1/2004 | Emma et al. | 712/240 |
| 2008/0120496 | A1 * | 5/2008 | Bradford et al. | 712/239 |
| 2009/0217017 | A1 | 8/2009 | Alexander et al. | |
| 2010/0017586 | A1 | 1/2010 | Gelman et al. | |
| 2010/0058038 | A1 | 3/2010 | Wang et al. | |
| 2011/0153945 | A1 | 6/2011 | Kim et al. | |
| 2012/0042155 | A1 | 2/2012 | Rychlik | |
| 2013/0198499 | A1 | 8/2013 | Dice et al. | |
| 2013/0339695 | A1 | 12/2013 | Bonanno et al. | |
| 2014/0019738 | A1 | 1/2014 | Kataoka et al. | |

OTHER PUBLICATIONS

A. Seznec, "The L-TAGE Branch predictor," Journal of Instruction Level Parallelism May 9, 2007, pp. 1-13.

Anonymous, Power and Performance Improvements Using a Selective Branch Target Buffer Entry Replacement, http://www.ip.com/pubview/IPCOM146501D; Feb. 13, 2007, 4 pages.

Burcea, et al., Phantom-BTB: A Virtualized Branch Target Buffer Design, ASPLOS '09, Washington, DC, Mar. 7-11, 2009, 11 pages.

Calder, et al., Next Cache Line and Set Prediction, Proceedings of 22nd Annual Intern'l Symposium on Computer Architecture, ACM, 1995, 10 pages.

Gonclaves, et al, "Evaluating the effects of branch prediction accuracy on the performance ofSMT architectures," Proceedings of Ninth Euromicro Workshop on Parallel and DistributedProcessing, Feb. 2001, pp. 1-9.

Hily and Seznec, "Branch Prediction and Simultaneous Multithreading," Proceedings of the1996 Conference on Parallel Architectures and Compilation Techniques, Mar. 1996, pp. 1-10.

IBM TDB (Mar. 2004). Pre-thread Valid Bits for Multi-threaded Effective to Real Address Translation (ERATs). IPCOM000022179D, 2 pages.

Jimenez, Delay-Sensitive Branch Predictors for Future Technologies, PhD Thesis, University of Texas at Austin, Jan. 2002, 165 pages.

Lee, et al., "Branch prediction strategies and branch target buffer design," Computer, vol. 17, Issue 1, Jan. 1984, pp. 1-22.

McFarling, Combining Branch Predictors, Technical Report TN-36m, Digital Western Research Laboratory, Jun. 1993, 29 pages.

Pan, et al., Correlation-Based Branch Target Buffer Design, http://www.ip.com/pubview/IPCOM000104329D, Mar. 19, 2005, 5 pages.

Tullsen, et al, "Simultaneous Multithreading: Maximizing On-Chip Parallelism," Proceedings of the 22nd Annual International Symposium on Computer Architecture, Jun. 1995, pp. 1-12.

U.S. Appl. No. 13/524,314 Non-Final Office Action dated Mar. 23, 2015, 23 pages.

* cited by examiner

SEMI-EXCLUSIVE SECOND-LEVEL BRANCH TARGET BUFFER

DOMESTIC PRIORITY

This application is a continuation of U.S. application Ser. No. 13/524,314 filed Jun. 15, 2012, the disclosure of which is incorporated by reference herein in its entirety.

BACKGROUND

The present invention relates generally to computer processing systems, and more specifically, to a semi-exclusive second-level branch target buffer.

An instruction pipeline in a computer processor improves instruction execution throughput by processing instructions using a number of pipeline stages, where multiple stages can act on different instructions of an instruction stream in parallel. A conditional branch instruction in an instruction stream may result in a pipeline stall if the processor waits until the conditional branch instruction is resolved in an execution stage in the pipeline before fetching a next instruction in an instruction fetching stage for the pipeline. A branch predictor may attempt to guess whether a conditional branch will be taken or not. A branch predictor may also include branch target prediction, which attempts to guess a target of a taken conditional or unconditional branch before it is computed by decoding and executing the instruction itself. A branch target may be a computed address based on an offset and/or an indirect reference through a register.

A branch target buffer (BTB) can be used to predict the target of a predicted taken branch instruction based on the address of the branch instruction. Predicting the target of the branch instruction can prevent pipeline stalls by not waiting for the branch instruction to reach the execution stage of the pipeline to compute the branch target address. By performing branch target prediction, the branch's target instruction decode may be performed in the same cycle or the cycle after the branch instruction instead of having multiple bubble/empty cycles between the branch instruction and the target of the predicted taken branch instruction. Other branch prediction components that may be included in the BTB or implemented separately include a branch history table and a pattern history table. A branch history table can predict the direction of a branch (taken vs. not taken) as a function of the branch address. A pattern history table can assist with direction prediction of a branch as a function of the pattern of branches encountered leading up to the given branch which is to be predicted.

SUMMARY

Exemplary embodiments include a computer-implemented method for a semi-exclusive second-level branch target buffer. The method includes performing a search to locate entries in a BTB2 having a memory region corresponding to a search request. Based on locating the entries in the BTB2, a bulk transfer of located entries is performed from the BTB2 to a BTBP. A state associated with the located entries is updated to encourage exclusivity between the BTB1 and the BTB2. Based on transferring a BTBP entry from the BTBP to a BTB1, a BTB1 entry is evicted from the BTB1. The evicted BTB1 entry is transferred from the BTB1 to the BTB2.

Additional exemplary embodiments include a computer program product for a semi-exclusive second-level branch target buffer. The computer program product includes a tangible storage medium readable by a processing circuit and storing instructions for execution by the processing circuit for performing a method. The method includes performing a search to locate entries in a BTB2 having a memory region corresponding to a search request. Based on locating the entries in the BTB2, a bulk transfer of located entries is performed from the BTB2 to a BTBP. A state associated with the located entries is updated to encourage exclusivity between the BTB1 and the BTB2. Based on transferring a BTBP entry from the BTBP to a BTB1, a BTB1 entry is evicted from the BTB1. The evicted BTB1 entry is transferred from the BTB1 to the BTB2.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
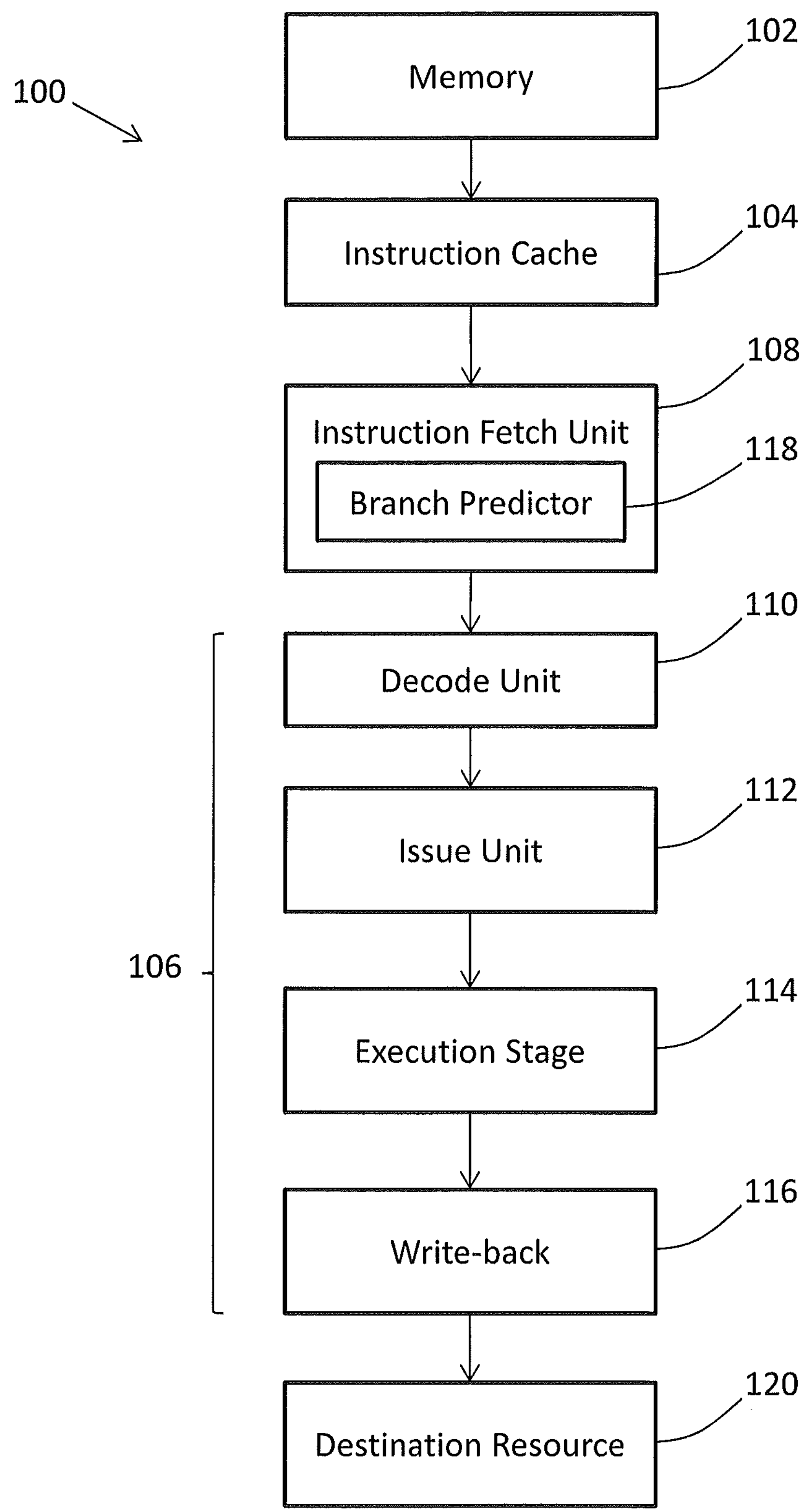
FIG. 1 depicts a processing system according to an embodiment.

Exemplary embodiments provide a semi-exclusive second-level branch target buffer. A branch predictor can include a branch target buffer (BTB) structure and a number of structures and buffers to support branch prediction and branch target prediction. The BTB can be searched in parallel to and independently from instruction fetching to find upcoming branches, in which case it is called lookahead branch prediction. Alternatively, it can be accessed simultaneously with or after fetching instructions and determining instruction boundaries in order to provide a prediction for each encountered branch instruction, in which case it is called synchronous branch prediction. In either case performance benefits of the BTB are a function of the accuracy of the prediction provided from the BTB and the latency between the taken branch and the taken branch's target instruction in the pipeline.

A larger BTB typically provides better prediction accuracy than a smaller BTB because it can store information about more branch instructions; however, a larger BTB typically has a longer latency than a smaller BTB. A large BTB may be implemented with one or more large static random access memory (SRAM) arrays or embedded dynamic random access memory (EDRAM) arrays. Such large SRAM arrays often have a limited number of read and write ports (e.g., only 1 or 2) and have restrictions such that it may not be possible to both read and write to the same bank of the SRAM array in the same cycle. A small BTB can be implemented with one or more small SRAM register files. SRAM register files are often much more flexible in providing multiple read and write ports. However, multi-ported register files are often less dense than SRAM arrays, making multi-ported register files infeasible to implement a sufficiently large BTB to provide adequate performance, especially in commercial workloads with large instruction (and therefore branch) footprints.

In exemplary embodiments, a BTB structure includes multiple levels, such as a first level BTB (BTB1), a slower but larger second-level BTB (BTB2), and an equally fast or faster but smaller branch target buffer preload table (BTBP). The BTBP is a small BTB that is searched in parallel with a larger main BTB (BTB1) to predict branch instructions' targets, and optionally direction. The BTB2 can be larger (and potentially slower) than the BTB1. Because the BTB1 and BTB2 are large, they can be implemented with large SRAM arrays which have a limited number of read and write ports. However, since the BTBP is much smaller than the BTB1, it can be implemented with SRAM register files. The BTBP may have many read and write ports that can be used simultaneously.

Two level BTBs typically support parallel lookups such that synchronous accesses of the first and second-level can be made to determine if BTB2 was successful in locating a matching entry if BTB1 was unsuccessful. When complex software applications switch between multiple modules, for example modules A, B, and C, BTB1 may hold branch predictions for a currently executing module (module A in this example) while the larger BTB2 holds branch predictions for all modules (A, B, C). When switching between modules, such from module A to module B, BTB1 will experience a number of misses, which could result in repeatedly making a number of higher latency lookups for all predictions from BTB2. In exemplary embodiments, the BTB2 operates asynchronously relative to BTB1 as a lookahead buffer. Logic searches the BTB2 for branch prediction information related to a memory region, e.g., one 4K page, and transfers all matching predictions into the BTBP. Predictions can be subsequently transferred from the BTBP to the BTB1 after a hit or match is detected in the BTBP as part of the branch prediction search process. Logic may be triggered when the BTB1 encounters a pattern of no prediction in the BTB1. In embodiments, the logic detects that the BTB1 may be lacking predictions and speculatively bulk transfers branch prediction information from the BTB2 for the memory region that the branch prediction is currently operating upon rather than making branch predictions directly from the BTB2.

Movement of branch prediction entries is managed between the BTB1, BTBP, and BTB2 to reduce duplicate entries between the BTB1 and BTB2. When an entry is copied from BTB2 to BTBP, it can be made least recently used (LRU) in the BTB2. Upon moving content from the BTBP to BTB1, the content that is evicted from BTB1 is written into the BTB2. In view of LRU entries in the BTB2 or through BTB2 entry invalidation, this forms an exclusive-type design. The result is an exchange of BTB1 and BTB2 entries for some cases, depending on mapping of BTB2 congruence classes to BTB1 congruence classes, resulting in a semi-exclusive BTB2 implementation.

FIG. 1 depicts a block diagram of a processing system 100 according to an embodiment. The processing system 100 includes a memory 102, an instruction cache 104, an instruction fetch unit 108, and a processing pipeline 106. The processing system 100 may be included within a computer processor or otherwise distributed within a computer system. Instructions and data can be stored in memory 102, and the instruction cache 104 may access instructions in memory 102 and store the instructions to be fetched. The memory 102 may include any type of volatile or non-volatile memory, such as cache memory. The memory 102 and instruction cache 104 can include multiple cache levels. A data cache (not depicted) may also be included in the processing system 100.

In FIG. 1, a simplified example of the instruction fetch unit 108 and the processing pipeline 106 are depicted. The processing system 100 can further include multiple processing pipelines 106 and instruction fetch units 108. The processing pipeline 106 includes a decode unit 110, an issue unit 112, an execution stage 114, and write-back logic 116. The entire instruction fetch unit 108 or the branch predictor 118 may also be part of the processing pipeline 106. The processing pipeline 106 can include other features, such as error checking and handling logic, one or more parallel paths through the processing pipeline 106, and other features known in the art. While a forward path through the processing system 100 is depicted in FIG. 1, other feedback and signaling paths may be included between elements of the processing system 100.

The instruction fetch unit 108 fetches instructions from the instruction cache 104 for further processing by the decode unit 110. In an exemplary embodiment, the instruction fetch unit 108 includes a branch predictor 118. Alternatively, the branch predictor 118 may be located separately from the instruction fetch unit 108. The instruction fetch unit 108 can also include other branch prediction logic (not depicted). The branch predictor 118 is an example of a processing circuit to implement a semi-exclusive second-level branch target buffer.

The decode unit 110 decodes instructions and passes the decoded instructions, portions of instructions, or other decoded data to the issue unit 112. The issue unit 112 analyzes the instructions or other data and transmits the decoded instructions, portions of instructions, or other data to one or more execution units in the execution stage 114 based on the analysis. The execution stage 114 executes the instructions. The execution stage 114 may include a plurality of execution units, such as fixed-point execution units, floating-point execution units, load/store execution units, and vector execution units. The write-back logic 116 writes results of instruction execution back to a destination resource 120. The destination resource 120 may be any type of resource, including registers, cache memory, other memory, I/O circuitry to communicate with other devices, other processing circuits, or any other type of destination for executed instructions or data.

Figure 2:
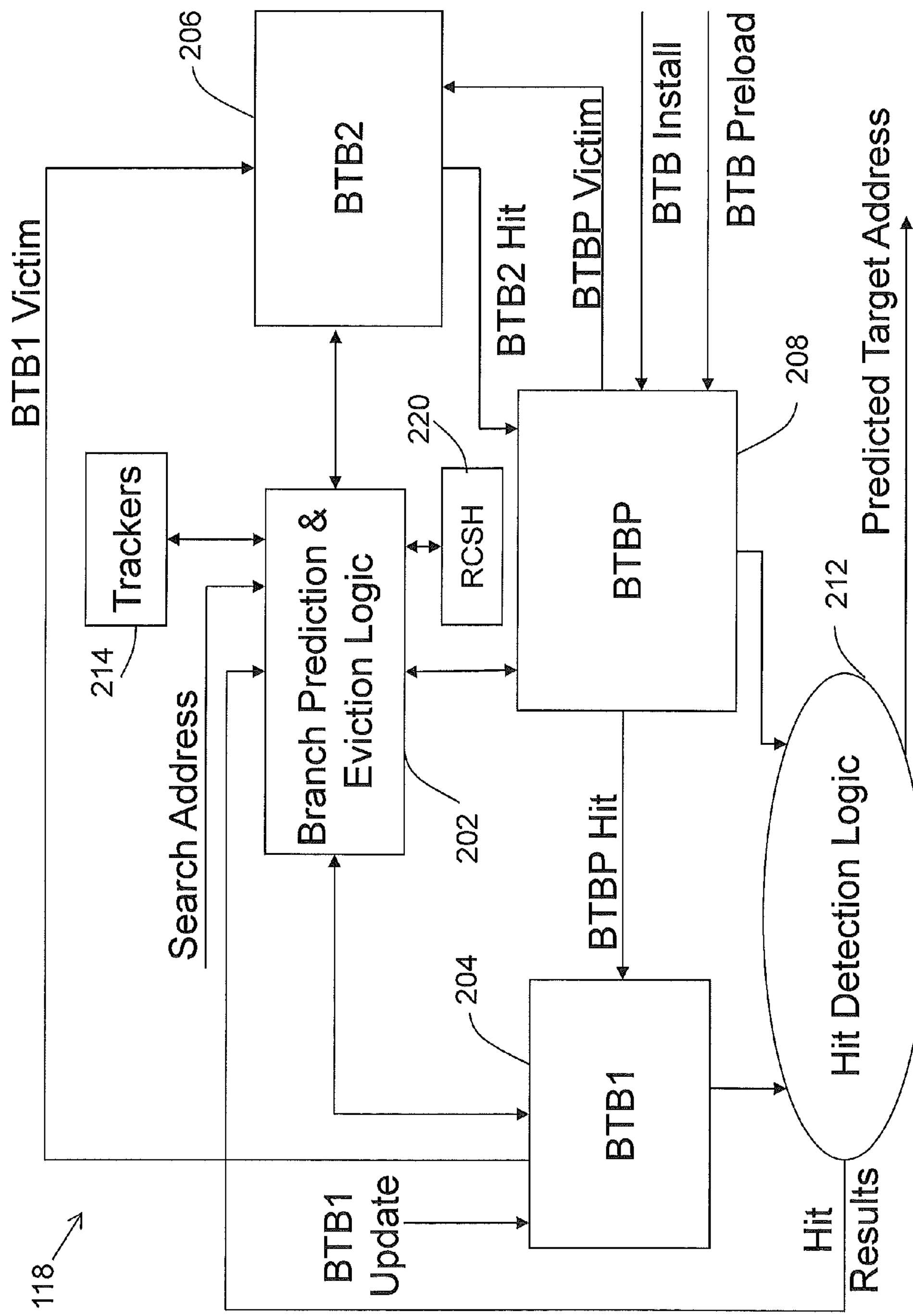
FIG. 2 depicts a branch predictor according to an embodiment.

FIG. 2 depicts an example of the branch predictor 118 of FIG. 1 in greater detail. The example branch predictor 118 of FIG. 2 includes branch prediction and eviction logic 202, BTB1 204, BTB2 206, BTBP 208, and hit detection logic 212. The branch prediction and eviction logic 202 can control access and updates of BTB entries in the BTB1 204, BTB2 206, and BTBP 208, as well as movement of BTB entries between the BTB1 204, BTB2 206, and BTBP 208. In an exemplary embodiment, BTB1 204 is a primary or first-level BTB and BTB2 206 is a secondary or second-level BTB. BTBP 208 is configured as a filter for BTB entries installed in the BTB1 204. BTB installs are performed through the BTBP 208, with BTB entries moving from the BTBP 208 to the BTB1 204 when hit detection logic 212 detects a hit or match from BTBP 208 data corresponding to a search request. When hit detection logic 212 has a BTB1 miss as a search result, the branch prediction and eviction logic 202 can, upon confirmation, trigger a search of the BTB2 206 for BTB entries within a same memory region for asynchronous transfer from the BTB2 206 to the BTBP 208. Searches of the BTB2 206 are managed using trackers 214. Recently completed search history (RCSH) 220 can be used to track a list of recently completed searches of the BTB2 206 and limit creation of new entries in the trackers 214. While the branch prediction and eviction logic 202 and the hit detection logic 212 are depicted separately, it will be understood that they can be combined into a single logic block or further subdivided.

Figure 3:
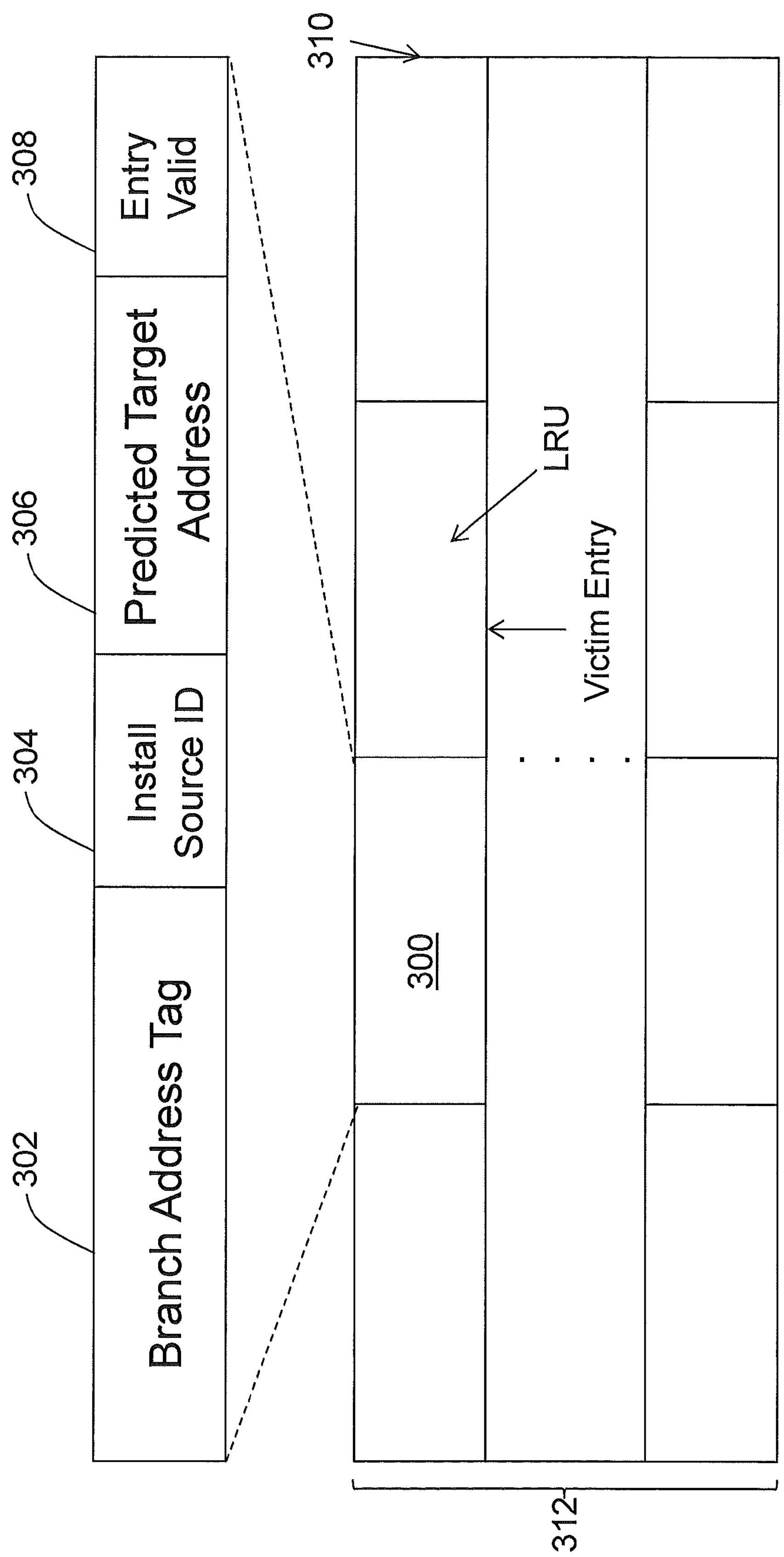
FIG. 3 depicts a branch target buffer entry according to an embodiment.

Each of the BTB1 204, BTB2 206, and the BTBP 208 is set associative, including multiple sets of BTB entries. The BTBP 208 is a cache of branch prediction information similar to BTB1 204. The BTB2 206 is a higher level cache of branch prediction information. A capacity of the BTBP 208 to store entries is less than a capacity of the BTB1 204 to store entries, and a capacity of the BTB2 206 is greater than the capacity of the BTB1 204 to store entries. A generic example of a BTB entry is depicted in FIG. 3 as BTB entry 300 (also referred to as entry 300), which includes a branch address tag 302, an install source ID field 304, a predicted target address 306, and an entry valid field 308. With continued reference to FIGS. 1-3, the branch address tag 302 is used to locate an entry within a BTB row 310, where each of the BTB1 204, BTB2 206, and BTBP 208 of FIG. 2 can include multiple BTB rows 312 and multiple set associative BTB entries per BTB row 310 (i.e., congruence class). The BTB1 204, BTB2 206, and BTBP 208 can have different numbers of BTB rows 312 and columns relative to each other. A least recently used (LRU) identifier can also be tracked to assist in determining which BTB entry 300 was least recently used. Additional tracking information can include a victim entry identifier that identifies which BTB entry 300 to overwrite when a new BTB entry 300 is installed. The victim entry and LRU identifiers may be tracked separately depending on an entry install/replacement algorithm used to populate BTB entries 300. Each BTB entry 300 can include other branch prediction information (not depicted), such as a branch direction to indicate whether the associated branch was taken or not taken.

The install source ID field 304 identifies an install source such as one of: a surprise install from the processing pipeline 106 of FIG. 1, a higher-level BTB install from BTB2 206, and a software preload install. The entry valid field 308 may be used to indicate an entry validity status of each BTB entry 300.

In an exemplary embodiment, a search address is used to access the branch predictor 118 and predict a branch target address. When looking for branch predictions, both the BTB1 204 and BTBP 208 are read. Either one can provide a branch prediction if it contains an entry with a branch address tag 302 matching the search address. The BTBP 208 and the BTB1 204 both provide input to hit detection logic 212 to determine whether a match or "hit" is located based on the search address. If a match is found, the hit detection logic 212 outputs a predicted target address. If the match was from the BTBP 208, a corresponding matching entry can be installed to the BTB1 204 as a BTBP hit to overwrite a victim entry in the BTB1 204, such that the most recent and relevant branch target predictions are maintained in the BTB1 204.

The BTBP 208 supports multiple install sources. Examples of install sources include: a surprise BTB install, a software preload install, and a BTB2 install for BTB2 hits. A surprise branch is a branch instruction that was not predicted by the hit detection logic 212. Surprise branches that qualify for being included in the branch predictor 118 (for example, resolved taken branches), are installed (written) into the BTBP 208. Another install source is a software preload install, which can be received from an architected preload instruction. In the example of FIG. 2, software preload installs are received as BTB preloads in the BTBP 208. Another install source can be a BTB2 hit from searching the BTB2 206.

When a branch completes and it is determined that prediction information provided by the BTB1 204 was wrong, a BTB update can be performed to the BTB1 204. For example, the BTB1 204 may also include prediction direction and strength information, such as strong not taken, weak not taken, weak taken, strong taken associated with each BTB entry 300. In an exemplary embodiment, BTB updates for prediction direction and strength are made to the BTB1 204 but are not made to the BTBP 208. Therefore, the BTB1 204 can act as a branch history table but the BTBP 208 may not be an accurate branch history table even though it can also hold prediction direction and strength information.

Transferring of BTB entries from the BTB2 206 to the BTBP 208 is performed in blocks, e.g., 4 kilobyte pages. Each bulk transfer moves a number of entries as sub-blocks and takes place over multiple cycles. Transfers of blocks are performed asynchronously with respect to searching of the BTB1 204. A confirmed or suspected miss of branch prediction in the BTB1 204 and BTBP 208 triggers searching in the BTB2 206. Detecting a surprise branch instruction at various stages of the pipeline past decode could trigger searching the BTB2 206. In an asynchronous lookahead level 1 branch predictor where the BTB1 204 and BTBP 208 is accessed asynchronously from instruction fetching and decode, based on failing to locate a matching entry in the BTB1 204 and BTBP 208 corresponding to a search request, a BTB1 and BTBP 208 miss can trigger BTB2 action if a predetermined number of searches have been unsuccessful since one or more of: a previous prediction, a surprise branch, and a restart of the search process. For example, after 3 unsuccessful searches in the BTB1 204 and BTBP 208, a secondary search of the BTB2 206 can be initiated using the search address which triggered the miss as a region for performing bulk transfers from the BTB2 206. Upon successfully completing a search of the BTB2 206, an entry can be recorded in the RCSH 220.

When a search of the BTB2 206 is successful and hits are identified, BTB2 entries are transferred to BTBP 208. Rather than invalidating the BTB2 entries in the BTB2 206 that were transferred (e.g., setting associated entry valid fields 308 to invalid), the BTB2 entries can be marked LRU. Marking BTB2 entries LRU may be performed by forcing an age status of the BTB2 entries to LRU on a BTB2 read while validity status of the BTB2 entries is unchanged. This avoids additional BTB2 writes to invalidate the BTB2 entries, while decreasing their potential lifespan since entries marked LRU will be overwritten in the near term and before more/most recently used entries. Alternatively or additionally, BTB2 entries can be made invalid to remove them from the BTB2 206. BTB2 entries written to the BTBP 208 will be transferred to BTB1 204 on a BTBP hit. When entries are evicted from the BTB1 204 to accommodate storing of new BTBP hits, the BTB1 victims are transferred to the BTB2 206. Controlling the transfer sequence of BTB entries can reduce the chances of retaining redundant entries in the BTB1 204 and BTB2 206. Entry location is semi-exclusive in that an entry is not guaranteed to be exclusively in the BTB1 204 or BTB2 206, but the chances of retaining duplicate copies of entries in both the BTB1 204 and BTB2 206 is reduced by the systems and processes described herein.

Figure 4:
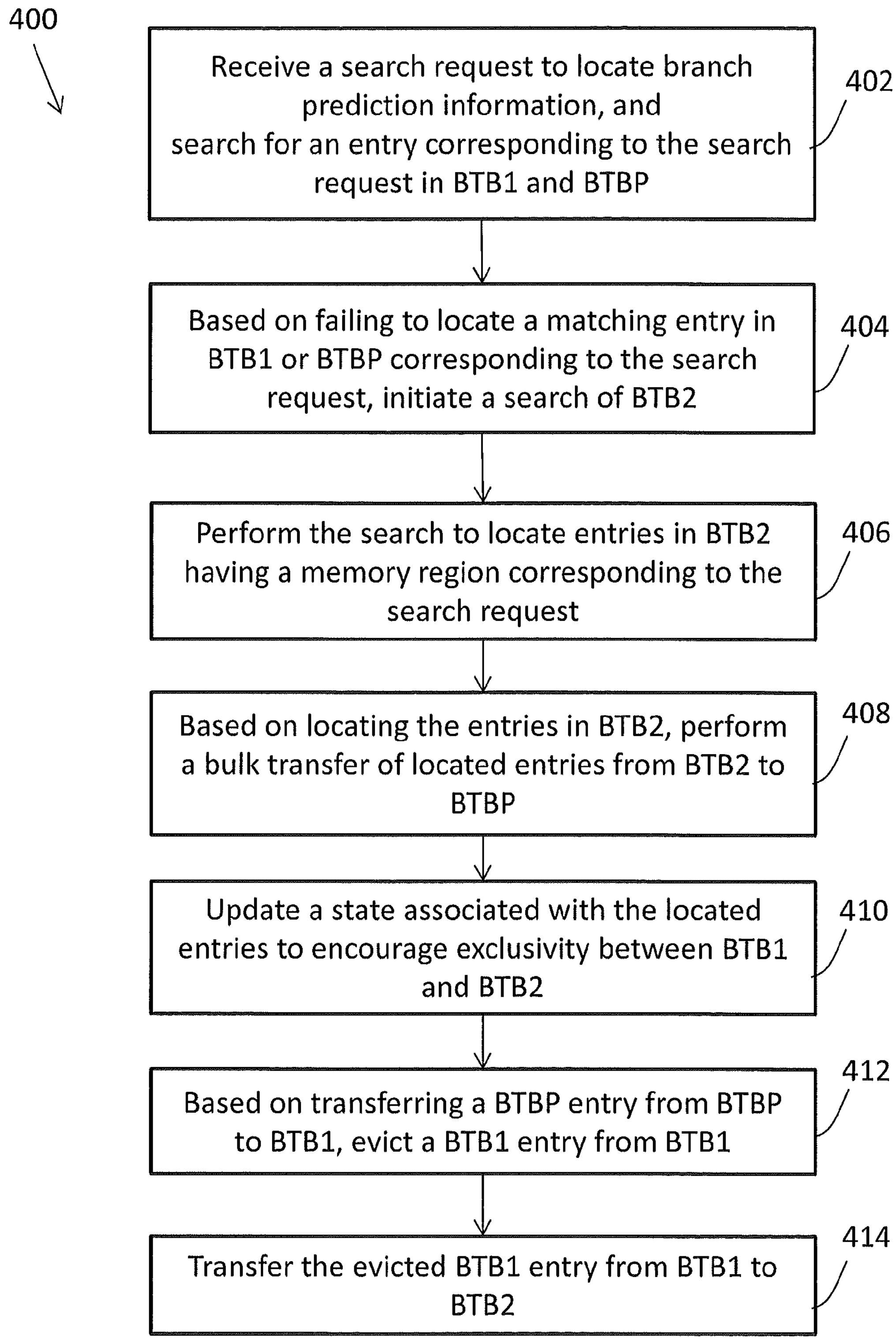
FIG. 4 is a flowchart illustrating a process for a semi-exclusive second-level branch target buffer according to an embodiment.

Turning now to FIG. 4, a process 400 for a semi-exclusive second-level branch target buffer will now be described in an exemplary embodiment. The process 400 is described in reference to FIGS. 1-3 and can be implemented by the branch predictor 118 of FIGS. 1 and 2.

At block 402, a search request to locate branch prediction information is received. The search request can include a search address that is passed to the branch prediction and eviction logic 202 and used to index into the BTB1 204 and BTBP 208. The branch prediction and eviction logic 202 searches for an entry corresponding to the search request in the BTB1 204 and BTBP 208. The search may be performed by passing a BTB row 310 of the BTB1 204 and BTBP 208, as indexed by the search address, to the hit detection logic 212 to compare branch address tags 302 of BTB entries 300 relative to bits of the search address and identify a matching entry or a "hit". Alternatively, a pair of BTB entries 300 from the BTB1 204 and BTBP 208 can be passed to the hit detection logic 212 for comparison. Hit results of the hit detection logic 212 are returned to the branch prediction and eviction logic 202.

At block 404, based on failing to locate a matching entry in the BTBP 208 corresponding to the search request and failing to locate the matching entry in the BTB1 204, the branch prediction and eviction logic 202 initiates a search to locate entries in the BTB2 206 having a memory region corresponding to the search request. Trackers 214 may be used to determine if/when the search can be initiated by tracking searches in progress.

At block 406, the search of the BTB2 206 is performed to locate entries in the BTB2 having a memory region corresponding to the search request. At block 408, based on locating the entries in the BTB2 206, the branch prediction and eviction logic 202 performs a bulk transfer of located entries from the BTB2 206 to the BTBP 208. A block of entries selected to transfer can be based on a memory region corresponding to the search request, for example a 4K page.

At block 410, a state associated with the located entries is updated to encourage exclusivity between the BTB1 204 and the BTB2 206. Updating the state can include performing one or more of: marking the located entries in the BTB2 206 as LRU, and setting a validity status of the located entries in the BTB2 206 to invalid. Entry validity status 308 of the entries in the BTB2 206 marked as LRU based on the search may be unchanged upon locating and transferring the entries in the BTB2 206 when the BTB2 entries are not immediately removed but made LRU. Furthermore, BTB2 entries can be removed by setting a validity status of the located entries in the BTB2 206 to invalid. State updates can be performed based on the search, based on the transfer, based on a BTB2 read, or deferred until a subsequent BTBP prediction. For example, upon a BTB2 hit, BTB2 hit location information, such as a BTB2 column number, can be stored in the BTBP 208. The update of the state associated with the located entries can be performed based on a prediction from the BTBP 208 of an entry having the BTB2 206 as an install source.

On a subsequent search request to locate branch prediction information, the BTB1 204 and the BTBP 208 are searched again based on the subsequent search request. Based on identifying a BTBP entry as a hit for the subsequent search request, the BTBP entry is transferred from the BTBP 208 to the BTB1 204. In an exemplary embodiment, the BTB1 204 is populated with content from BTBP entries identified as hits. At block 412, based on transferring a BTBP entry from the BTBP 208 to the BTB1 204, a BTB1 entry can be evicted from the BTB1 204. The BTB1 entry to evict is identified and overwritten with content from the BTBP entry. At block 414, the evicted BTB1 entry is transferred from the BTB1 204 to the BTB2 208 as a BTB1 victim. When writing to the BTB2 206, a BTB2 entry associated with the updated state is identified. The identified BTB2 entry can be overwritten with the evicted BTB1 entry.

When the BTBP 208 receives entries, an LRU BTBP entry can be selected to evict as a BTBP victim. The install source ID field 304 of the LRU BTBP entry can be checked to determine whether the install source was the BTB2 206. The LRU BTBP entry is evicted and the evicted BTBP entry can be transferred to the BTB2 206 based on determining that the install source of the evicted BTBP entry was the BTB2 206.

Figure 5:
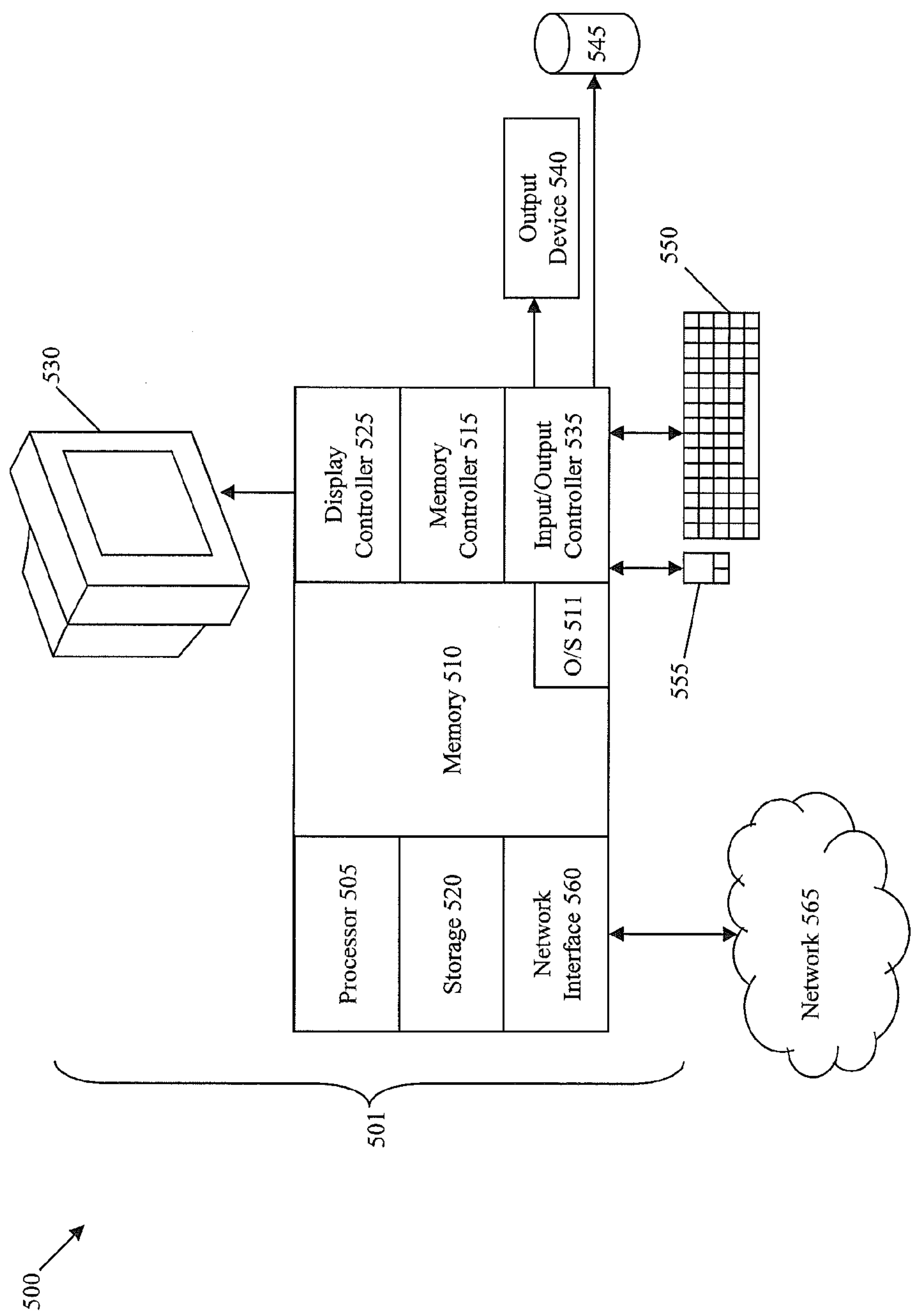
FIG. 5 depicts a computing system according to an embodiment.

FIG. 5 depicts a block diagram of a system 500 for a semi-exclusive second-level branch target buffer in a processor 505. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 500 therefore includes general-purpose computer 501 as illustrated in FIG. 5.

In an exemplary embodiment, in terms of hardware architecture, as shown in FIG. 5, the computer 501 includes a processor 505 which is a processing circuit that includes the processing pipeline 106 of FIG. 1 and a branch predictor 118. The computer 501 further includes memory 510 coupled to a memory controller 515, and one or more input and/or output (I/O) devices 540, 545 (or peripherals) that are communicatively coupled via a local input/output controller 535. The input/output controller 535 can be, for example but not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 505 is a hardware device for executing software, particularly that stored in storage 520, such as cache storage, or memory 510. The processor 505 can be any custom made or commercially available processor, a central processing unit (CPU), an auxiliary processor among several processors associated with the computer 501, a semiconductor based microprocessor (in the form of a microchip or chip set), a macroprocessor, or generally any device for executing instructions.

The memory 510 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, and/or other types of storage media. Note that the memory 510 can have a distributed architecture, where various components are situated remote from one another, but can be accessed by the processor 505.

The instructions in memory 510 may include one or more separate programs, each of which comprises an ordered listing of executable instructions for implementing logical functions. In the example of FIG. 5, the instructions in the memory 510 a suitable operating system (OS) 511. The operating system 511 essentially controls the execution of other computer programs and provides scheduling, input-output control, file and data management, memory management, and communication control and related services.

In an exemplary embodiment, a conventional keyboard 550 and mouse 555 can be coupled to the input/output controller 535. Other output devices such as the I/O devices 540, 545 may include input devices, for example but not limited to a printer, a scanner, microphone, and the like. Finally, the I/O devices 540, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 500 can further include a display controller 525 coupled to a display 530. In an exemplary embodiment, the system 500 can further include a network interface 560 for coupling to a network 565. The network 565 can be an IP-based network for communication between the computer 501 and any external server, client and the like via a broadband connection. The network 565 transmits and receives data between the computer 501 and external systems. In an exemplary embodiment, network 565 can be a managed IP network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 501 is a PC, workstation, intelligent device or the like, the instructions in the memory 510 may further include a basic input output system (BIOS) (omitted for simplicity). The BIOS is a set of essential software routines that initialize and test hardware at startup, start the OS 511, and support the transfer of data among the hardware devices. The BIOS is stored in ROM so that the BIOS can be executed when the computer 501 is activated.

When the computer 501 is in operation, the processor 505 is configured to fetch and execute instructions stored within the memory 510, to communicate data to and from the memory 510, and to generally control operations of the computer 501 pursuant to the instructions.

In an exemplary embodiment, where the branch predictor 118 of FIG. 2 is implemented in hardware, the methods described herein, such as process 400 of FIG. 4, can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
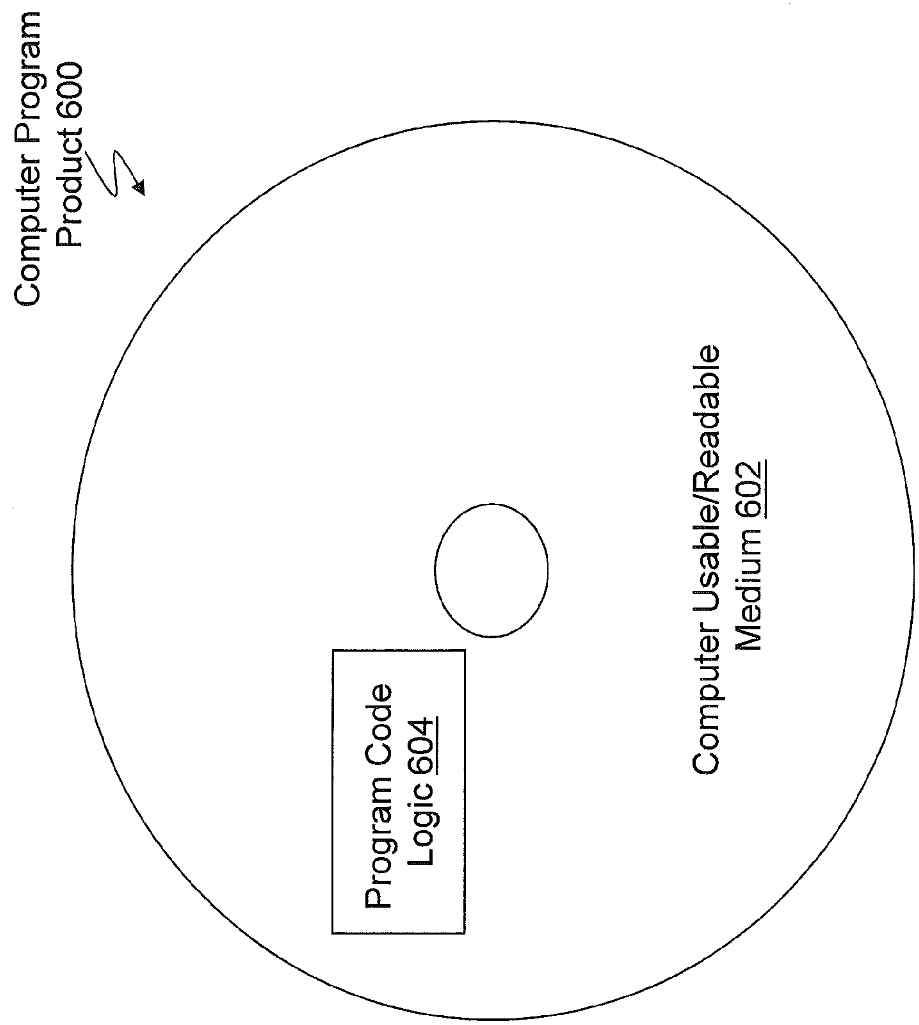
FIG. 6 depicts a computer-readable medium according to an embodiment.

Referring now to FIG. 6, in one example, a computer program product 600 includes, for instance, one or more storage media 602, wherein the media may be tangible and/or non-transitory, to store computer readable program code means or logic 604 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Embodiments include a system, method, and computer program product for a semi-exclusive second-level branch target buffer. The system includes a first-level branch target buffer (BTB1), a branch target buffer preload table (BTBP), a second-level branch target buffer (BTB2), and a processing circuit coupled to the BTB1, the BTBP, and the BTB2. The processing circuit is configured to perform a method. The method includes performing a search to locate entries in the BTB2 having a memory region corresponding to a search request. Based on locating the entries in the BTB2, a bulk transfer of located entries is performed from the BTB2 to the BTBP. A state associated with the located entries is updated to encourage exclusivity between the BTB1 and the BTB2. Based on transferring a BTBP entry from the BTBP to the BTB1, a BTB1 entry is evicted from the BTB1. The evicted BTB1 entry is transferred from the BTB1 to the BTB2.

In an embodiment, the processing circuit of the system is further configured to receive the search request to locate branch prediction information, and search for an entry corresponding to the search request in the BTB1 and the BTBP. In an embodiment, the processing circuit of the system is further configured to initiate the search to locate the entries in the BTB2 having a memory region corresponding to the search request based on failing to locate a matching entry in the BTBP corresponding to the search request and failing to locate the matching entry in the BTB1.

In an embodiment, the processing circuit of the system is further configured to receive a subsequent search request to locate branch prediction information, and search the BTB1 and the BTBP based on the subsequent search request. In an embodiment, the processing circuit of the system is further configured to identify the BTB1 entry to evict and overwrite with content from the BTBP entry based on identifying the BTBP entry as a hit for the subsequent search request and transferring the BTBP entry from the BTBP to the BTB1. In an embodiment, the processing circuit of the system is further configured to identify a BTB2 entry associated with the updated state and overwrite the identified BTB2 entry with the evicted BTB1 entry.

In an embodiment, updating, by the processing circuit, the state associated with the located entries includes performing one or more of: marking the located entries in the BTB2 as least recently used, and setting a validity status of the located entries in the BTB2 to invalid. In an embodiment, updating, by the processing circuit, the state associated with the located entries occurs upon a BTB2 read.

In an embodiment, the processing circuit of the system is further configured to perform upon a BTB2 hit, storing BTB2 hit location information in the BTBP, and upon a prediction from the BTBP of an entry having the BTB2 as an install source, performing the updating of the state associated with the located BTB2 entry.

In an embodiment, the processing circuit of the system is further configured to evict a least recently used BTBP entry from the BTBP, and transfer the evicted BTBP entry to the BTB2 based on determining that an install source of the evicted BTBP entry was the BTB2.

Technical effects and benefits include controlling movement of entries between a BTB1, BTBP, and BTB2 of a branch predictor to reduce duplicate entries between the BTB1 and BTB2. BTB2 hits are moved to the BTBP, BTBP hits are moved to the BTB1, and evicted BTB1 entries (BTB1 victims) are moved to the BTB2. Marking BTB2 entries as least recently used (LRU) when they are transferred to the BTBP increases the chances of the marked BTB2 entries being overwritten in the near term to reduce duplicate entries and also avoid extra writes that may otherwise be needed to remove (invalidate) the BTB2 entries. Alternatively, direct invalidation of BTB2 entries can be performed. The BTBP may act as a filter to only populate BTB1 with entries identified as hits (used). Entries evicted from the BTBP may be written to the BTB2 if the BTB2 was the install source.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for a semi-exclusive second-level branch target buffer, the method comprising:

performing a search to locate a plurality of entries in a second-level branch target buffer (BTB2) having a memory region corresponding to a search request;

based on locating the entries in the BTB2, performing a bulk transfer of a plurality of located entries from the BTB2 to a branch target buffer preload table (BTBP);

updating, by a processing circuit, a state associated with the located entries from the BTB2 to encourage exclusivity between a first-level branch target buffer (BTB1) and the BTB2 by marking the located entries in the BTB2 as least recently used to force an age status change and decrease a potential lifespan of the located entries in the BTB2 based on transferring the located entries from the BTB2 to the BTBP;

based on transferring a BTBP entry from the BTBP to the BTB1, evicting, by the processing circuit, a BTB1 entry from the BTB1, wherein the BTB2 is larger than the BTB1, the BTBP is smaller than the BTB1, and the BTBP is searched in parallel with the BTB1 to predict a branch instruction target;

transferring the evicted BTB1 entry from the BTB1 to the BTB2;

upon a BTB2 hit, storing BTB2 hit location information comprising a BTB2 column number in the BTBP; and upon a prediction from the BTBP of an entry having the BTB2 as an install source, performing the updating of the state associated with the located BTB2 entry.

2. The computer-implemented method of claim 1, further comprising:

receiving the search request to locate branch prediction information;

searching for an entry corresponding to the search request in the BTB1 and the BTBP; and based on failing to locate a matching entry in the BTBP corresponding to the search request and failing to locate the matching entry in the BTB1, initiating the search to locate the entries in the BTB2 having a memory region corresponding to the search request.

3. The computer-implemented method of claim 2, further comprising:

receiving a subsequent search request to locate branch prediction information;

searching the BTB1 and the BTBP based on the subsequent search request; and based on identifying the BTBP entry as a hit for the subsequent search request, transferring the BTBP entry from the BTBP to the BTB1, and identifying the BTB1 entry to evict and overwrite with content from the BTBP entry.

4. The computer-implemented method of claim 3, further comprising:

identifying a BTB2 entry associated with the updated state; and overwriting the identified BTB2 entry with the evicted BTB1 entry.

5. The computer-implemented method of claim 1, wherein updating, by the processing circuit, the state associated with the located entries comprises:

setting a validity status of the located entries in the BTB2 to invalid.

6. The computer-implemented method of claim 1, further comprising:

evicting a least recently used BTBP entry from the BTBP; and transferring the evicted BTBP entry to the BTB2 based on determining that an install source of the evicted BTBP entry was the BTB2.

7. The computer-implemented method of claim 1, wherein the BTB1 is only populated with content from BTBP entries identified as hits.

8. A computer program product for a semi-exclusive second-level branch target buffer, the computer program product comprising:

a non-transitory storage medium that is readable by a processing circuit and storing instructions for execution by the processing circuit for performing a method comprising:

performing a search to locate a plurality of entries in a second-level branch target buffer (BTB2) having a memory region corresponding to a search request;

based on locating the entries in the BTB2, performing a bulk transfer of a plurality of located entries from the BTB2 to a branch target buffer preload table (BTBP);

updating, by the processing circuit, a state associated with the located entries from the BTB2 to encourage exclusivity between a first-level branch target buffer (BTB1) and the BTB2 by marking the located entries in the BTB2 as least recently used to force an age status change and decrease a potential lifespan of the located entries in the BTB2 based on transferring the located entries from the BTB2 to the BTBP;

based on transferring a BTBP entry from the BTBP to the BTB1, evicting, by the processing circuit, a BTB1 entry from the BTB1, wherein the BTB2 is larger than the BTB1, the BTBP is smaller than the BTB1, and the BTBP is searched in parallel with the BTB1 to predict a branch instruction target;

transferring the evicted BTB1 entry from the BTB1 to the BTB2;

upon a BTB2 hit, storing BTB2 hit location information comprising a BTB2 column number in the BTBP; and upon a prediction from the BTBP of an entry having the BTB2 as an install source, performing the updating of the state associated with the located BTB2 entry.

9. The computer program product of claim 8, wherein the method further comprises:

receiving the search request to locate branch prediction information;

searching for an entry corresponding to the search request in the BTB1 and the BTBP;

based on failing to locate a matching entry in the BTBP corresponding to the search request and failing to locate the matching entry in the BTB1, initiating the search to locate the entries in the BTB2 having a memory region corresponding to the search request;

receiving a subsequent search request to locate branch prediction information;

searching the BTB1 and the BTBP based on the subsequent search request; and based on identifying the BTBP entry as a hit for the subsequent search request, transferring the BTBP entry from the BTBP to the BTB1, and identifying the BTB1 entry to evict and overwrite with content from the BTBP entry.

10. The computer program product of claim 9, wherein the method further comprises:

identifying a BTB2 entry associated with the updated state; and overwriting the identified BTB2 entry with the evicted BTB1 entry.

11. The computer program product of claim 8, wherein updating, by the processing circuit, the state associated with the located entries comprises:

setting a validity status of the located entries in the BTB2 to invalid.

12. The computer program product of claim 8, wherein the BTB1 is only populated with content from BTBP entries identified as hits.

* * * * *